(12) United States Patent
Wu et al.

(10) Patent No.: US 7,284,104 B1
(45) Date of Patent: Oct. 16, 2007

(54) VOLUME-BASED INCREMENTAL BACKUP AND RECOVERY OF FILES

(75) Inventors: Weibao Wu, Roseville, MN (US); Anand A. Kekre, Pune (IN); Gang Lin, Plymouth, MN (US)

(73) Assignee: VERITAS Operating Corporation, Cupertino, CA (US)

( * ) Notice: Subject to any disclaimer, the term of this patent is extended or adjusted under 35 U.S.C. 154(b) by 413 days.

(21) Appl. No.: 10/610,134

(22) Filed: Jun. 30, 2003

(51) Int. Cl.
*G06F 12/16* (2006.01)
(52) U.S. Cl. ...................... 711/162; 707/204
(58) Field of Classification Search ............. 711/162
See application file for complete search history.

(56) References Cited

U.S. PATENT DOCUMENTS

| | | | |
|---|---|---|---|
| 5,504,873 A * | 4/1996 | Martin et al. ............... 711/111 |
| 5,897,661 A * | 4/1999 | Baranovsky et al. ........ 711/170 |
| 6,101,585 A | 8/2000 | Brown et al. |
| 6,105,078 A * | 8/2000 | Crockett et al. ............. 710/18 |
| 6,665,815 B1 | 12/2003 | Goldstein et al. |
| 6,829,688 B2 | 12/2004 | Grubbs et al. |
| 6,847,983 B2 | 1/2005 | Somalwar et al. |
| 6,880,051 B2 | 4/2005 | Timpanaro-Perrotta |
| 2003/0061456 A1 * | 3/2003 | Ofek et al. ................. 711/162 |
| 2003/0158869 A1 * | 8/2003 | Micka ........................ 707/203 |
| 2003/0177306 A1 * | 9/2003 | Cochran et al. ............ 711/114 |
| 2004/0268068 A1 | 12/2004 | Curran |

OTHER PUBLICATIONS

"Instructor Articles," VERITAS Education, pp. 1-7, Apr. 2003.
"EMC TimeFinder Family," EMC Corporation, 8 pages, Oct. 2004.
"EMC TimeFinder Local Replication," EMC Corporation, 2 pages, Oct. 2004.

* cited by examiner

*Primary Examiner*—Matthew Kim
*Assistant Examiner*—Shane M Thomas
(74) *Attorney, Agent, or Firm*—Meyertons Hood Kivlin Kowert & Goetzel, P.C.; B Noël Kivlin

(57) ABSTRACT

Various embodiments of systems and methods for performing volume-based incremental backups are disclosed. A method may involve generating a snappoint of a volume. The snappoint indicates which portions (e.g., blocks or extents) of the volume have been modified between a time at which the snappoint was generated and a time at which a subsequent snappoint was generated. The method may also involve accessing information mapping the file to the volume and, if the snappoint identifies as having been modified any blocks of the volume to which the file maps, copying those blocks from the subsequent snappoint to the backup device. Portions not identified as having been modified by the snappoint are not copied. Program instructions implementing such a method may be stored on a computer accessible medium.

17 Claims, 7 Drawing Sheets

VOLUME-BASED INCREMENTAL BACKUP AND RECOVERY OF FILES

BACKGROUND

1. Field of the Invention

This invention relates to storage systems and, more particularly, to performing backups.

2. Description of the Related Art

File systems organize and manage information stored in a computer system. File systems may support the organization of user data by providing and tracking organizational structures such as files, folders, and directories. The file system may interpret and access information stored in a variety of storage media, abstracting complexities associated with the tasks of locating, retrieving, and writing data to the storage media.

Backups are typically performed by copying individual files from one volume to another. In order to locate each file being copied, each file is typically accessed through the file system. The file system maintains metadata (e.g., in an inode table or master file table) that is used to locate the blocks within each file on the primary volume being backed up. Accessing this metadata may itself involve accessing the primary volume, and thus locating the files may involve significant amount of I/O. Furthermore, performing backups through the file system may increase the load on the file system, which may in turn decrease file system performance for the duration of the backup. Accordingly, improved methods of performing backups are desired.

SUMMARY

Various embodiments of systems and methods for performing volume-based incremental backups are disclosed. A method may involve generating a snappoint of a volume. The snappoint indicates which portions (e.g., blocks or extents) of the volume have been modified between a time at which the snappoint was generated and a time at which a subsequent snappoint was generated. The method may also involve accessing information mapping the file to the volume and, if the snappoint identifies as having been modified any blocks of the volume to which the file maps, copying those blocks from the subsequent snappoint to the backup device. Portions not identified as having been modified by the snappoint are not copied. Program instructions implementing such a method may be stored on a computer accessible medium.

Such a method may also roll a file back to a prior state by: mapping each extent of the file to an extent of the snappoint and to a corresponding extent of the volume; and, for each extent of the snappoint to which the file maps, writing to the volume data included within that extent of the snappoint if that extent of the snappoint does not map to a same volume offset as the corresponding extent of the volume or if data within the corresponding extent of the volume has been modified subsequent to the time at which the snappoint was generated. If the data is copied back to the volume from the snappoint, the file in the volume may be truncated to the size of the file at the time at which the snappoint was generated.

A system may include a primary volume, a backup volume, and a host coupled to the primary volume and the backup volume. The host may be configured to access (e.g., read and/or write) a snappoint of the primary volume. The snappoint indicates which blocks within the volume have been modified between a time at which the snappoint was generated and a time at which a subsequent snappoint was generated. The host is configured to access information mapping a file to the volume. If the snappoint identifies any portions of the volume to which the file maps as having been modified, the host is configured to copy one or more of the portions identified by the snappoint as having been modified from the subsequent snappoint to the backup volume.

In another embodiment, a system may include a primary volume, a backup device; a primary host coupled to the primary volume and the backup device and configured to generate a snappoint of the primary volume; and a backup host coupled to receive information from the primary host identifying portions of the volume that have been modified between the snappoint and a subsequent snappoint. The backup host may be configured to access information mapping a file to the volume. If the snappoint identifies any portions of the volume to which the file maps as having been modified, the backup host may copy one or more of the portions identified by the information as having been modified from the subsequent snappoint to the backup device.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
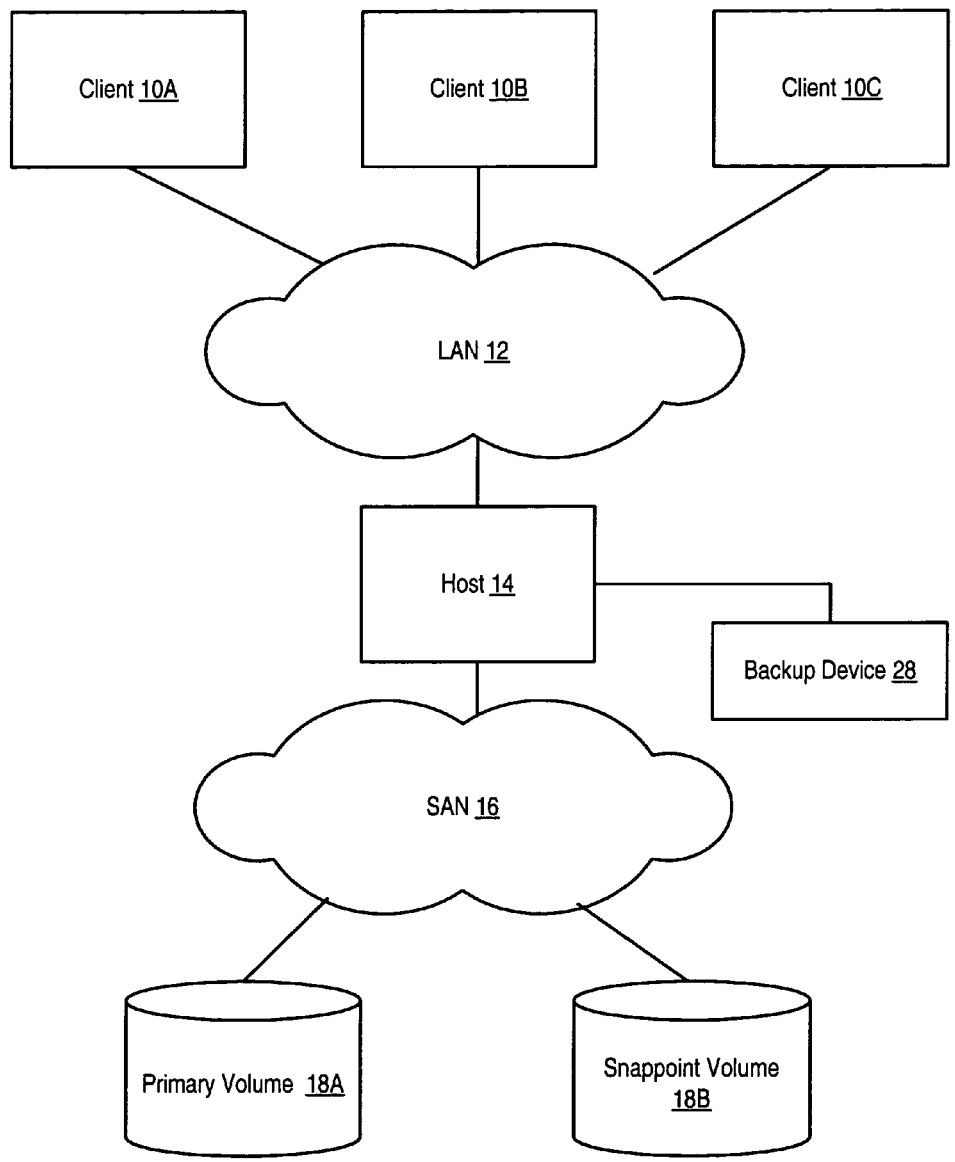
FIG. 1 illustrates a system configured to implement volume-based incremental backups, according to one embodiment.

FIG. 1 illustrates an exemplary system that may implement volume-based incremental backups and recovery of files. As shown, such a system may include several storage volumes 18A-18B, a SAN (Storage Area Network) 16, one or more hosts (which may also be referred to as servers) 14, a LAN (Local Area Network) 12, a backup device 28, and/or several client devices 10A-10B. Note that other embodiments may include fewer or additional components. Throughout this disclosure, drawing elements identified by the same numeral followed by a unique alphabetic identifier (e.g., storage volumes 18A and 18B) may be collectively referred to by that numeral alone (e.g., storage volumes 18).

Snappoint volume 18B may be used to store one or more snappoints of primary volume 18A. Each snappoint represents a point-in-time copy of the primary volume 18A.

Storage volumes 18A-18B are logical volumes that may be implemented using various physical storage media. Each storage volume 18 may be implementing using a mass storage device, such as a hard disk, Flash memory device, CD-ROM (Compact Disc Read Only Memory), or DVD (Digital Versatile Disc) ROM. A storage volume 18 may also be implemented from a combination of several such devices. For example, a storage volume 18 may include one or more arrays of such storage devices. In one embodiment, each storage volume 18 may be implemented using a RAID (Redundant Array of Independent Disks) subsystem. In other embodiments, each storage volume 18 may be implemented using a portion of the storage available in a mass storage device or array of mass storage devices. Storage volumes 18 may also be referred to as LUNs (Logical Units) or VLUNs (Virtual Logical Units).

While only a single primary volume 18A is illustrated in FIG. 1, it is noted that other embodiments may include several primary volumes 18A. In some embodiments, a single file system may span multiple primary volumes 18A. Snappoints of each primary volume spanned by the file system may be generated independently. Incremental backups of such a file system may be performed using a snappoint of each of the component volumes.

Backup device 28 may be coupled to a host 14 directly or via a network such as LAN 12 or SAN 16. In some embodiments, backup device 28 may include one or more tape drives. Alternatively, backup device 28 may be implemented using one or more optical drives such as magneto-optic, CD (Compact Disc), or DVD (Digital Versatile Disc) drives. In still other embodiments, backup device 28 may be implemented using the same type of storage media as storage volumes 18. For example, backup device 28 may include one or more disk drives and be coupled to a host 14 via SAN 16.

Host(s) 14 may be implemented from any of various types of computing devices. As used herein, the term "host" refers to any computing device that includes a memory and at least one processor configured to execute instructions stored in the memory, or to any integrated circuit (e.g., an FPGA (Field Programmable Gate Array) or ASIC (Application Specific Integrated Circuit)) configured to perform the functions specified by such instructions, or any mechanical device configured to perform such functions. Each host 14 may be configured to implement all or part of a volume-based incremental backup and/or recovery operation for one or more files using information obtained from one or more snappoints in snappoint volume 18B and information mapping a file to a snappoint, as described below.

In the illustrated embodiment, the host(s) 14 are coupled to each other and to clients 10 by a LAN 12. The host(s) 14 are also each coupled to the storage volumes 18 by a SAN 16. Note that in other embodiments, storage volumes 18 may be implemented using NAS (Network Attached Storage) devices coupled to the hosts 14 by LAN 12. Similarly, in other embodiments, host(s) 14 may be coupled to each other and to clients 10 by a WAN (Wide Area Network).

In some embodiments, space on each storage volume 18 may be allocated in logical blocks. For example, multiple 512-byte sectors may be combined to form logical blocks. In one embodiment, a file system may support logical block sizes of 1024, 2048, 4096, and/or 8192 bytes. One or more adjacent logical blocks may be grouped into an extent. An extent is a group of one or more adjacent logical blocks specified by an address-length pair, which identifies the starting block address and the length of the extent in logical blocks. The file system may allocate storage in multi-block extents or groups of extents rather than a block at a time. Extents may allow storage device I/O to take place in units of multiple blocks if storage is allocated in consecutive blocks. For sequential I/O, multiple-block operations may take less time to perform than block-at-a-time operations. Note that in some embodiments, extents may have a constant length (e.g., one block). In such embodiments, the length for each extent may be implicit (e.g., the length for each extent may not be specified in extent information maintained for each file).

Figure 2:
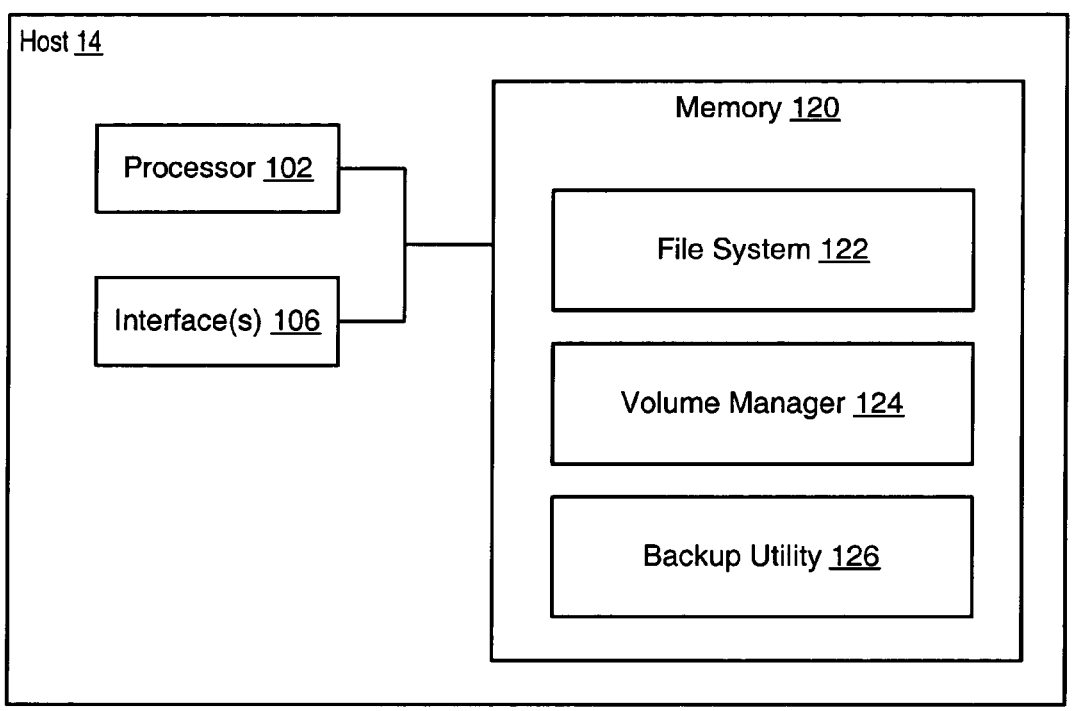
FIG. 2 is a block diagram of a host system configured to participate in volume-based incremental backups, according to another embodiment.

FIG. 2 shows a block diagram of a host 14 that includes one or more processors 102, a memory 120, and one or more interfaces 106 (e.g., to SAN 16 and/or to LAN 12 of FIG. 1). In the illustrated embodiment, instructions and data implementing a file system 122 are stored in memory 120 and executed by one or more processors 102. Memory 120 may also store program instructions executable by processor(s) 102 to implement a volume manager 124 and a backup utility 126 configured to perform volume-based incremental backups. Note that in another embodiment, host 14 may include an FPGA or other hardware configured to implement all or part of a file system 122, a volume manager 124, and/or a backup utility 126 configured to perform volume-based incremental backups.

In some embodiments, file system 122, volume manager 124, and/or backup utility 126 may each be part of a distributed application used by various components of a networked computer system. In such embodiments, file system 122, volume manager 124, and/or backup utility 126 may each be executed on one system (e.g., a file server) and accessed by other systems (e.g., user workstations coupled to the file server by a local area network). In other embodiments, file system 122, volume manager 124, and/or backup utility 126 may each be implemented and used within a single host 14. In still other embodiments, file system 122, volume manager 124, and/or backup utility 126 may each be implemented as a clustered application on multiple hosts.

File system 122 manages files stored within primary volume 18A (as shown in FIG. 1). Exemplary types of files that may be managed by file system 122 include regular files (e.g., text or binary data files), directory files (files which include other files and/or directories), executable files, symbolic links (files which point to other files), device special files (files which provide an interface to hardware), sockets (files which provide an interface to a network program), and named pipes (files which provide access to other programs). File system 122 may use metadata (e.g., in an inode table or master file table) to track where each portion of each file is stored. File system 122 may be one of various types of file systems.

Volume manager 124 may define and manage one or more primary storage volumes 18A. Volume manager 124 may maintain information mapping the primary storage volume to one or more underlying physical storage devices. The volume manager 124 may receive access requests (e.g., requests to read or write) targeting the primary storage volume and translate those requests into requests targeting the appropriate extents of the underlying physical storage devices.

Figure 3:
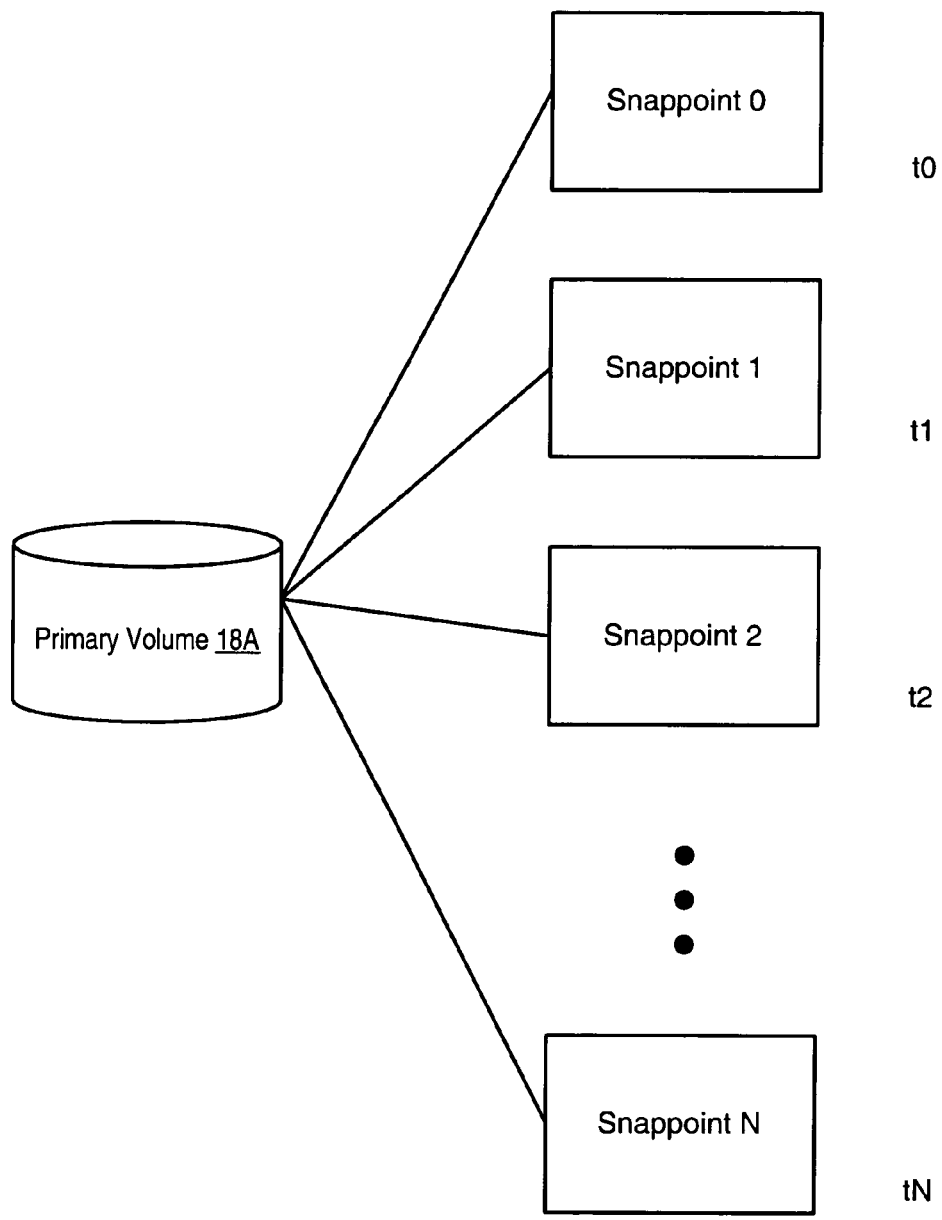
FIG. 3 illustrates how snappoints of a volume may be generated at different points in time, according to one embodiment.

The volume manager 124 may also be configured to generate snappoints of one or more primary storage volumes 18A at various points in time. An exemplary series of snappoints, Snappoint 0-Snappoint N, are shown in FIG. 3. Each snappoint represents a point-in-time copy of a primary storage volume 18A. In some embodiments, these snappoints may be generated using a mirror volume that is synchronized to the primary volume 18A and then deported at the point-in-time at which the snappoint is created. A snappoint generated using this technique may also be referred to as a third-mirror breakoff snapshot. Alternatively, snappoints may be generated using a COW (Copy On Write) technique. For example, Snappoint 0 may be created at time t0. Initially, Snappoint 0 may contain a pointer to each block or extent of the primary volume 18A. Between t0 and t1 (the creation time of the next snappoint), if blocks or extents of the primary volume are modified, the original contents (at t0) of these blocks or extents may be written to Snappoint 0 before being modified (subsequent modifications to the same blocks prior to t1 may not cause changes in Snappoint 0, however). Thus, for any blocks or extents modified between t0 and t1, Snappoint 0 may store the original contents of those blocks instead of a pointer. Accordingly, Snappoint 0 represents the state of the primary volume at time t0. Snappoints 1-N similarly represent copies of the primary volume at times t1-tN respectively. It is noted that other techniques may also be used to generate snappoints.

In general, each snappoint generated by the volume manager 124 represents a point-in-time copy of a primary volume 18A. The volume manager 124 may generate snappoints independently for each volume 18A managed by that volume manager 124. Each snappoint may include a bitmap or other data that indicates which portions (e.g., blocks or extents) of the primary volume have been modified from the time at which that snappoint was created until the time at which the next snappoint is created. For example, each snappoint created using a COW technique may include a bitmap that indicates which portions of the storage volume were modified subsequent to creation of that snappoint and prior to the creation of the next snappoint. Similarly, each snappoint created from a synchronized mirror volume may include information tracking changes to the primary volume subsequent to the time at which the mirror volume is deported and prior to the creation of the next snappoint. Each snappoint may be stored in a snappoint volume 18B (as shown in FIG. 1).

Since the snappoints are created and managed by the volume manager 124, as opposed to the file system 122, no special file system API (Application Programming Interface) or other specialized file system support is needed to access the snappoints and to identify which portions of the volume have changed between a given pair of snappoints. Additionally, the same volume manager 124 routines may be executable to generate snappoints for volumes on which a variety of different file systems may be mounted. For example, the same volume manager 124 routines may be used to generate snappoints for file systems such as VxFS (Veritas File System™), NTFS (New Technology File System), UFS (UNIX File System), etc.

The volume manager 124 (or, alternatively, the backup utility 126) may access one or more snappoints to identify which portions of each of one or more primary volumes 18A have changed between the time at which two snappoints were created. For example, the volume manager 124 may access changed block information associated with Snappoint 0 to determine which blocks of a primary volume 18A changed between Snappoint 0 and Snappoint 1. The volume manager 124 may provide information indicating which portions of the primary volume 18A have been modified between any two snappoints to the backup utility 126.

The backup utility 126 may use the information identifying the changed portions of the storage volume to perform block-level incremental backups of the modified portions included in all or part of the primary volume 18A. For example, the backup utility 124 may perform a full backup of the primary volume from Snappoint 0. The backup utility 126 may subsequently access a volume manager API to find out which portions of the primary volume have changed between the full backup and Snappoint 1. The volume manager 124 may return the information identifying which portions of the storage volume have changed between Snappoint 0 and Snappoint 1. In response, the backup utility 126 may then perform an incremental backup of the volume by copying the identified portions of the primary volume from Snappoint 1 to the backup device 28. Portions of the primary volume 18A that are not identified as having been modified between the two snappoints may not be copied to the backup device 28 during an incremental backup. The backup utility 126 may alternate between performing full backups and incremental backups (or alternate between a given number of each different type of backup).

When the backup utility 126 has completed an incremental backup using a particular snappoint, the volume manager 124 may change the snappoint to a dataless snappoint. A dataless snappoint may identify which portions of the volume have changed between that snappoint and a subsequent snappoint without actually identifying the original contents of the modified portions. Thus, unlike a non-dataless snappoint (referred to as a dataful snappoint), a dataless snappoint may not store the original contents of any portion of the primary volume modified subsequent to the creation of that snappoint and prior to the creation of the next snappoint. Dataless snappoints may take up less storage space than dataful snappoints.

Figure 4:
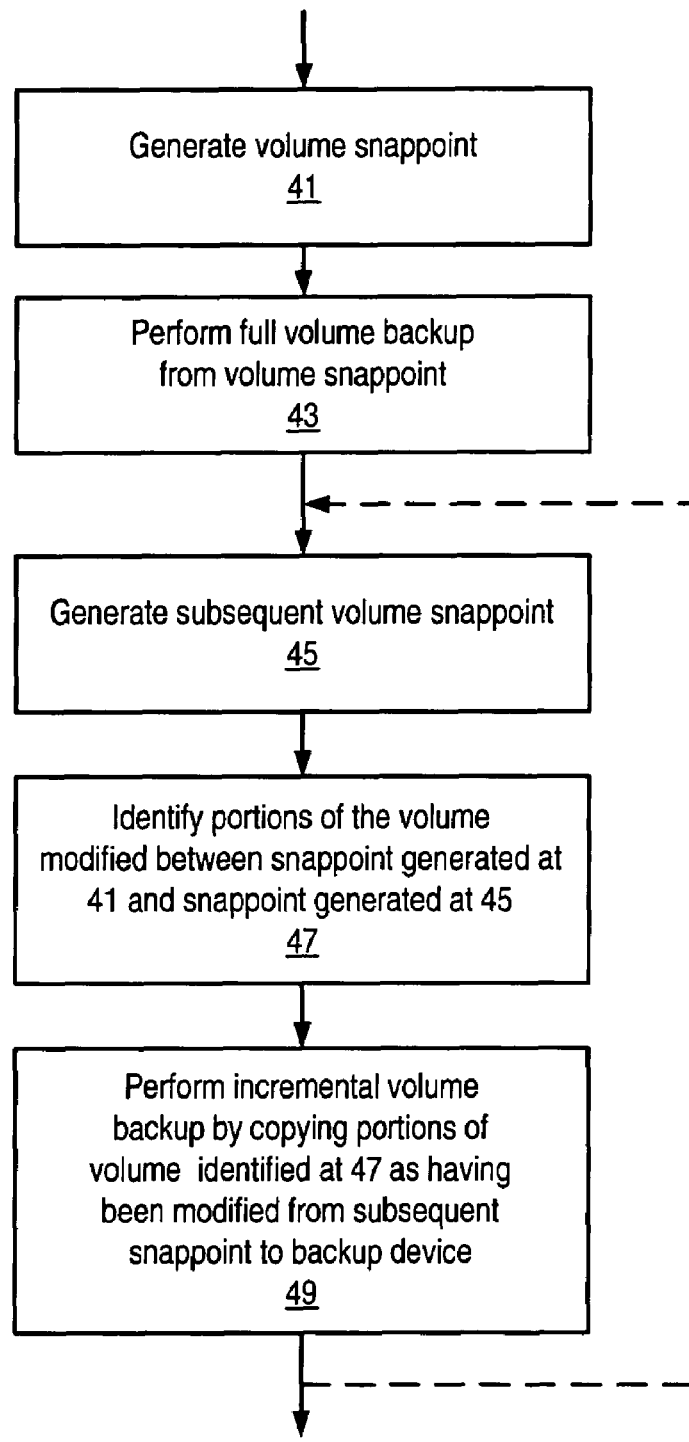
FIG. 4 is a flowchart illustrating how a volume-based incremental backup of a volume may be performed, according to one embodiment.

FIG. 4 is a flowchart illustrating how a volume may be backed up, according to one embodiment. At 41, a volume snappoint is generated by a volume manager. The volume snappoint represents a point-in-time copy of a volume. Generating the snappoint may involve tracking which portions of the primary volume are modified between the time at which the snappoint is created and a time at which the next snappoint is created. At 43, a full volume backup of the volume is performed from the volume snappoint. Thus, the full volume backup backs up the state of the volume at the time when the volume snappoint was created. At 45, a subsequent volume snappoint is generated. This subsequent snappoint represents another point-in-time copy of the volume.

An incremental backup may be performed from the snappoint generated at 45 to backup any portions of the volume that have changed since the most recent full backup (performed at 43 in this example). At 47, the portions of the storage volume that were modified between the time at which the snappoint generated at 41 was created and the time at which the snappoint generated at 45 was created are identified. This may involve accessing information associated with the snappoint generated at 41 that indicates which portions of the storage volume were modified from the creation of that snappoint until the creation of the next snappoint. If the snappoint generated at 45 is not the next snappoint to be generated after the snappoint generated at 41, one or more intervening snappoints may also be accessed to identify modified portions of the storage volume.

In response to the modified portions of the storage volume being identified at 47, a volume-based incremental backup is performed by copying portions of volume identified as having been modified from the snappoint generated at 45 to a backup device. Portions of the volume that are not identified as having been modified volume snappoint may not be copied to the backup volume. Assuming that the fewer than all of the portions of the volume are identified as having been modified, the incremental backup may take less time and/or require less data movement to perform than the full backup performed at 43.

As indicated by the dashed line in FIG. 4, the process of generating subsequent snappoints of the volume (as shown at 45), identifying modified portions of the volume between snappoints (as shown at 47), and performing incremental backups of the volume based on the changes between snappoints (as shown at 49) may repeat for one or more additional snappoints. Subsequent incremental backups may either backup changed portions of the volume since the last full backup (at 43) or changed portions of the backup since the last incremental backup (at 49).

To restore the volume to its state at a particular point in time, the backup utility 126 may perform a restore from the most recent full backup (e.g., generated at 43 of FIG. 4). The backup utility 126 may then perform a restore from each subsequent volume-based incremental backup (e.g., generated at 49).

Volume-Based Incremental Backups and Rollbacks of Files

For a given type of file system (e.g., VxFS (Veritas File System™), UFS (Unix File System), NTFS (New Technology File System), etc.), certain file system data may be stored at the same location within any volume on which that type of file system is mounted. For example, one type of file system may typically store certain file system metadata (which is usable to locate other files and metadata within the volume) beginning at logical block 2 of a volume on which that file system is mounted. Accordingly, the mapping of the files within a particular type of file system to the primary volume may be determined by accessing various file system metadata, which may be stored at a particular volume location determined by which type of file system is mounted on the primary volume.

The backup utility 126 may be configured to use the mapping of file system data to a volume in order to perform volume-based incremental backups of individual files. In one embodiment, for each file, the backup utility 126 may use the file-to-volume mapping to determine which portions of the volume store portions of that file. For example, a file may include two file extents that are mapped to the primary volume according the following mapping information:

| file offset | volume offset | extent size |
|---|---|---|
| 0 | 102400 | 51200 |
| 51200 | 819200 | 1024 |

The backup utility 126 may then query the volume manager 124 to determine whether any of the volume extents [102400, 102400+51200], [819200, 819200+1024] to which the file maps are identified as being modified (e.g., since the last backup). The volume manager 124 may responsively access one or more snappoints to determine whether any portions of the storage volume within the specified range of the file have been modified. If any portions of the file, as determined by looking for changes within the volume extents specified by the backup utility, have been modified, the volume manager 124 may return information identifying the modified portions of the file to the backup utility 126.

The backup utility 126 may perform incremental backups of each individual file within a file system. If the file system spans multiple primary volumes 18A, different files included in that file system may be located on different volumes. The backup utility 126 may access a snappoint associated with each of the primary volumes 18A when performing incremental backups of such files in the multi-volume file system.

Figure 5:
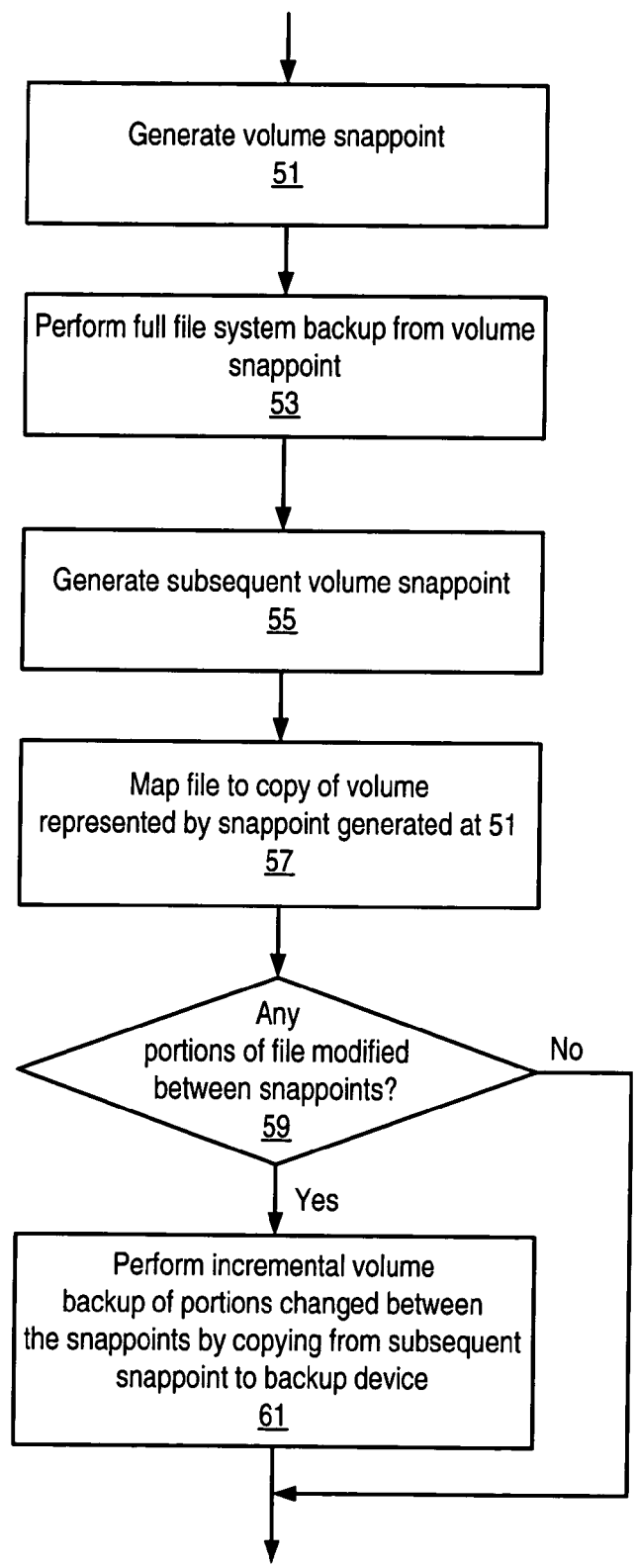
FIG. 5 is a flowchart of how a volume-based incremental backup of a file may be performed, according to one embodiment.

FIG. 5 is a flowchart of how volume-based incremental backup of a file may be performed, according to one embodiment. A volume snappoint (for each of one or more volumes) may be generated, as indicated at 51 (this function may be similar to function 41 of FIG. 4). A full file system backup may be performed from the one or more volume snappoints, as shown at 53 (this function may be similar to function 43 of FIG. 4). A subsequent set of one or more volume snappoints may be generated, as indicated at 55, at a time subsequent to when the earlier volume snappoint is generated. This earlier snappoint may indicate, at least in part, which portions of the volume have been modified since the earlier snappoint generated at 51.

At 57, a file is mapped to the copy of the volume represented by the earlier snappoint. This function may be performed by determining, based on the type of file system mounted on the volume, where file system metadata is located relative to the copy of the volume. The file system metadata may then be accessed to determine how the file is mapped to the copy of the volume.

Once the location of the file within the copy of the volume is determined, the earlier snappoint generated at 51 may be accessed to determine whether any portions of the file are identified as having been modified between the two snappoints, as indicated at 59. If the snappoint generated at 55 is not the next sequential snappoint generated after the earlier snappoint generated at 51, one or more intervening snappoints may also be accessed to identify modified portions of the volume. If any portions of the volume that map to the file are identified as having been modified between the two snappoints, an incremental backup of the portions of the file identified as having been modified may be performed from the subsequent snappoint to a backup device, as indicated at 61. Otherwise, the file may not be included in an incremental backup.

Functions 57-61 may be repeated for other files that map to the volume. In one embodiment, functions 57-61 may be repeated for each file that maps to the copy of the volume represented by the earlier snappoint. Furthermore, functions 55-61 may be repeated for additional subsequent snappoints.

The backup utility 126 may also be configured to perform file rollbacks using volume snappoints generated by the volume manager 124. A file rollback may restore a file to the file's state at a particular point in time represented by one of the volume snappoints. A file rollback may involve the backup utility 126 or volume manager 124 accessing file system information (the location of which may be determined based on the type of file system, as described above) mapping the file to a point-in-time copy of the volume. In some embodiments, the backup utility 126 may then query the volume manager 124 as to whether the portions of the point-in-time copy of the volume to which the file maps have been modified subsequent to that point-in-time. The volume manager 124 (or the backup utility 126) may access a snappoint that represents that point-in-time copy to determine whether any portions of the point-in-time copy of the volume to which the file maps were modified subsequent to that point-in-time. The backup utility 126 may also map the file to the volume and compare the extents to which the file maps in the snappoint representing the point-in-time copy to the corresponding extents to which the file maps in the volume to determine whether any portion of the file has been modified since the snappoint. If so, the backup utility 126 may roll the file back to that point in time by copying the original contents of the portion of the file from the snappoint (or from a backup generated from that snappoint or an earlier snappoint, if the snappoint is a dataless snappoint) to the volume.

Figure 6:
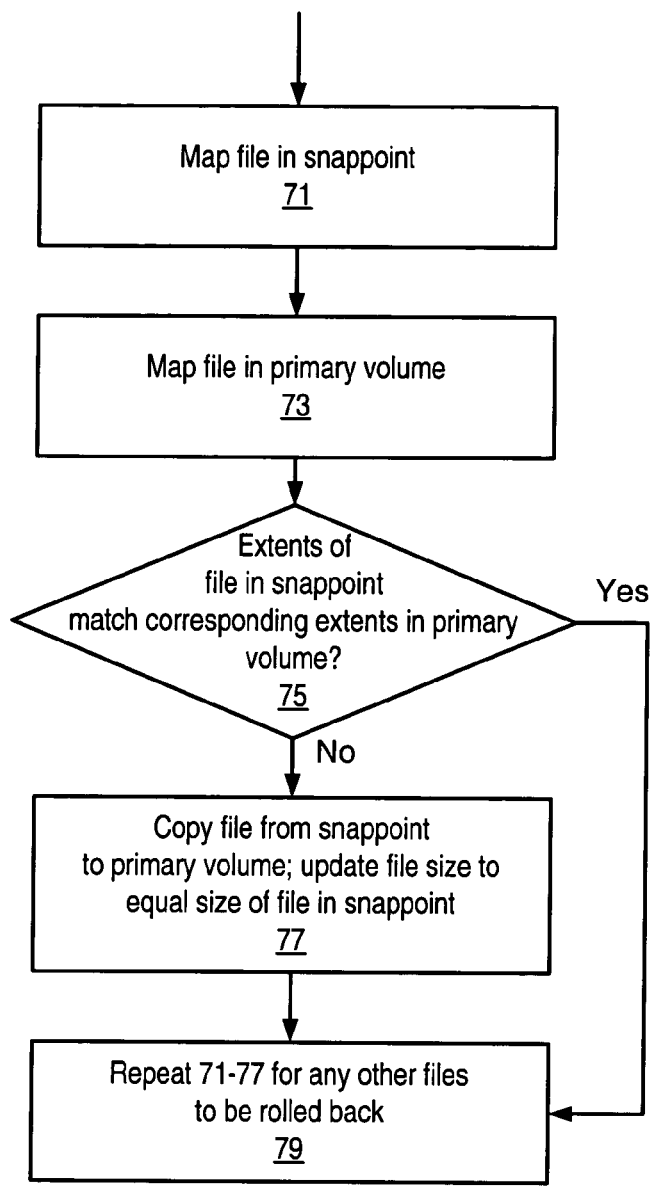
FIG. 6 is a flowchart of how file recovery may be performed using volume-based snappoint information, according to one embodiment.

FIG. 6 is a flowchart of how file recovery may be performed using volume-based snappoint information, according to one embodiment. At 71, a file is mapped to a snappoint that represents a point-in-time copy of a primary volume. Similarly, at 73, the file is mapped to the primary volume. These functions 71-73 may be performed using knowledge about how the particular type of file system mounted on the primary volume maps file system data to a volume. This mapping may involve generating information indicating the file offset, length, and volume offset of each extent within the file for both the snappoint and the primary volume. Each extent of the file [file offset, length] maps to an extent in the snappoint [volume offset, length] and to a corresponding extent [volume offset, length] in the primary volume.

The extents of the file in the snappoint may be compared to the corresponding extents of the file in the primary volume to determine if these extents match, as indicated at 75. A snappoint extent matches its corresponding primary volume extent match if both extents map to the same volume offset and if the snappoint indicates that the data within the extent has not changed. A volume manager may access the snappoint to determine whether the snappoint indicates that the data within the extent has changed. In some situations, one or more of the snappoint or volume extents may need to be split into two or sub-extents for the primary volume extents and snappoint extents to be comparable.

If the extents do not match, the data in the file may be copied from the snappoint to the primary volume, as indicated at 77. The file is also updated so that its size is the same as its size in the snappoint. For example, if the file in the primary volume is expanded after the snappoint is created and the file is being rolled back, the file data may be copied from the snappoint to the primary volume and the size of the file may be reduced to its size when the snappoint was created.

Figure 7:
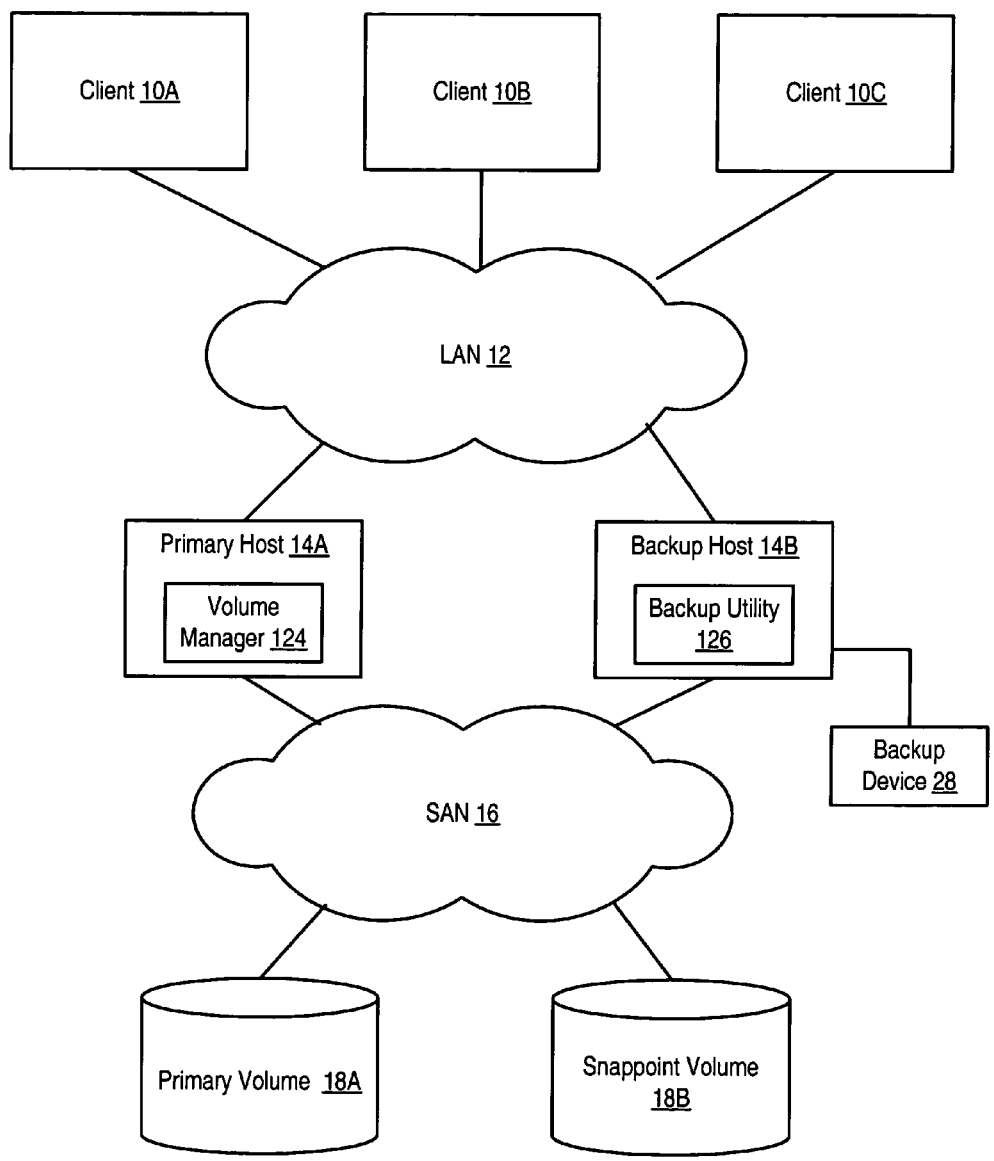
FIG. 7 illustrates a system in which an off-host volume-based incremental backup may be performed, according to one embodiment.

In some embodiments, the backup utility 126 may be implemented on a different host than the file system 122 and volume manager 124. For example, FIG. 7 shows a system in which a primary host 14A and a backup host 14B are coupled to each other via a LAN 12 and to storage volumes 18 via a SAN 16. Backup host 14B is coupled to a backup device 28 (e.g., an optical, disk, or tape drive). Backup host 14B may be coupled to backup device 28 directly or via LAN 12 or SAN 16.

The volume manager 124 that generates snappoints of the primary volume 18A may be implemented on host 14A, while the backup utility 126 that uses information obtained from the snappoints to perform volume-based incremental backups and/or rollbacks may be implemented on backup host 18B. The primary host 14A may provide the backup host 14B with the snappoints or information obtained from the snappoints indicating which portions of the primary volume 18A have been modified subsequent to the last backup. Alternatively, the primary host 14A may store this information to a storage volume via the SAN 16 and provide the backup host 14B with address information indicating the location of this information (e.g., in a message sent via LAN 12). The backup utility 126 on the backup host 14B may use the information to perform a volume-based incremental backup to backup device 28. By offloading at least a portion of the backup activity to the backup host 14B, performance of applications on the primary host 14A may be improved.

In one embodiment, snappoint volume 18B may be a mirror volume. The primary host 14A may create a snappoint of primary volume 18A by synchronizing mirror volume 18B to primary volume 18A. At the point in time at which a snappoint is desired, the primary host 14A may deport the mirror volume 18B. The primary host 14A may generate information tracking which portions of the primary volume 18A were modified between the creation of a previous snappoint and the creation of that snappoint. The primary host 14A may then provide this information to the backup host 14B.

The backup host 14B may perform a volume-based incremental backup and/or recovery from the snappoint by importing the mirror volume 18B and using the information indicating which portions of the primary volume 18A were modified between the previous sequential snappoint and the current snappoint to identify which portions of the mirror volume 18B to copy to the backup device 28. The backup host 14B may perform either an incremental backup of the full volume or an incremental backup of one or more particular files within the volume. In the latter situation, the backup host 14B may mount a file system on the mirror volume and use file system information to map each file to the point-in-time copy of the primary volume 18A represented by the mirror volume 18B. The backup host 14B may use the mapping information for each file in conjunction with the information identifying modified portions of the primary volume received from primary host 14A to determine which portions of each file, if any, to copy from the mirror volume 18B to the backup device 28.

After the backup host 14B completes the incremental backup, the backup host 14B may deport the mirror volume 18B. The primary host 14A may import the mirror volume 18B, turn the current snappoint into a dataless snappoint, and then prepare for creating a new snappoint by resynchronizing the mirror volume 18B with the primary volume 18A.

Alternatively, the backup host 14B and primary host 14A may each implement a distributed volume manager 124 configured such that the backup host 14B can read a snappoint (generated using COW techniques, mirror-breakoff techniques, and so on) from the primary host 14A without requiring the snappoint to be split from the primary host 14A.

Returning to FIGS. 1, 2, and 7, note that each host computer system 14 and client 10 may take various forms, including a workstation, server, mainframe computer system, network appliance, network switch, network computer, Internet appliance, personal digital assistant (PDA), embedded device, smart phone, television system, another suitable device, or combinations thereof.

Additionally, note that program instructions executable to implement all or part of the functionality of a file system 122, volume manager 124, and/or backup utility 126 may be stored on various computer accessible media such as memory 120. Examples of computer accessible media may include computer-readable media that may include hard disk storage, floppy disk storage, removable disk storage, flash memory, MEMS (Micro Electro Mechanical Systems) memory, punch cards, magnetic core, and random access memory (RAM). Computer accessible media may include an installation medium, e.g., a CD-ROM or floppy disk. In addition, a computer accessible medium may be included in one computer system that provides the program instructions over a network to another computer system for execution. Thus, various embodiments may further include receiving, sending or storing instructions and/or data implemented in accordance with the foregoing description upon a computer accessible medium. A computer accessible medium may include a communication medium such as network and/or a wireless link on which communication signals such as electrical, electromagnetic, optical, or digital signals are conveyed.

The flow charts described herein represent exemplary embodiments of methods. The methods may be implemented in software, hardware, or a combination thereof. The order of the method may be changed, and various elements may be added, reordered, combined, omitted, modified, etc.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method for backing up one or more files including a first file, comprising:
   generating a first snappoint of a volume, wherein the first snappoint is a dataful snappoint in that it includes information indicative of the contents of said volume at a first point in time and information indicating which portions of said volume have been modified subsequent to said first point in time and prior to a second point in time corresponding to a second snappoint;
   using said first snappoint to perform a backup of said volume to a backup device;
   subsequent to said first point in time, updating said first snappoint;
   generating said second snappoint of said volume at said second point in time;
   performing an incremental backup of said first file after said second point in time by:
      accessing information mapping said first file to said volume;
      using said information mapping said first file to said volume to determine whether said first snappoint indicates that any portions of said volume that map to said first file have been modified;
      if said first snappoint indicates that any portions of said volume that map to said first file have been modified, copying the modified portions from said second snappoint to said backup device, and not copying portions of said volume that map to said first file that have not been modified; and
   in response to completion of said copying from said second snappoint, changing the first snappoint from a dataful snappoint into a dataless snappoint, wherein said dataless snappoint identifies which portions of the volume are modified relative to said first point in time without identifying the actual contents of the modified portions.

2. The method of claim 1, wherein said information indicative of the contents of said volume in said first snappoint includes one or more pointers to locations in said volume.

3. The method of claim 2, wherein said information indicative of the contents of said volume in said first snappoint includes the actual contents of locations in said volume at said first point in time.

4. The method of claim 1, wherein before said updating, said first snappoint includes a pointer to a first location of said volume, and after said updating, said first snappoint includes, instead of said pointer, the contents of said first location of said volume at said first point in time.

5. The method of claim 1, wherein said updating said first snappoint includes identifying which portions of said volume have been modified subsequent to said first point in time and prior to said second point in time.

6. The method of claim 5, wherein said updating said first snappoint includes storing, for portions of said volume modified subsequent to said first point in time, the contents of said portions at said first point in time.

7. The method of claim 1, further comprising performing an incremental backup for a remainder of said one or more files.

8. The method of claim 1, wherein said accessing information mapping said first file to said volume includes accessing file system metadata mapping said first file to the volume.

9. A system for backing up one or more files including a first file, comprising:
   a processor; and
   a memory coupled to the processor and configured to store program instructions executable by the processor to:
      generate a first snappoint of a volume, wherein the first snappoint is a dataful snappoint in that it includes information indicative of the contents of said volume at a first point in time and information indicating which portions of said volume have been modified subsequent to said first point in time and prior to a second point in time corresponding to a second snappoint;
      use said first snappoint to perform a backup of said volume to a backup device;
      subsequent to said first point in time, update said first snappoint;
      generate said second snappoint of said volume at said second point in time;
      perform an incremental backup of said first file after said second point in time by:
         accessing information mapping said first file to said volume;
         using said information mapping said first file to said volume to determine whether said first snappoint indicates that any portions of said volume that map to said first file have been modified;

if said first snappoint indicates that any portions of said volume that map to said first file have been modified, copying the modified portions from said second snappoint to said backup device, and not copying portions of said volume that map to said first file that have not been modified; and in response to completion of said copying from said second snappoint, changing the first snappoint into a dataless snappoint, wherein said dataless snappoint identifies which portions of the volume are modified relative to said first point in time without identifying the actual contents of the modified portions.

10. The system of claim 9, wherein said information indicative of the contents of said volume in said first snappoint includes one or more pointers to locations in said volume.

11. The system of claim 10, wherein said information indicative of the contents of said volume in said first snappoint includes the actual contents of locations in said volume at said first point in time.

12. The system of claim 9, wherein said memory includes program instructions executable to update said first snappoint from having a pointer to a first location in said volume to having, instead of said pointer, the contents of said first location of said volume at said first point in time.

13. The system of claim 9, wherein said program instructions executable to perform said update include program instructions executable to update which portions of said volume have been modified subsequent to said first point in time and prior to said second point in time.

14. The system of claim 13, wherein said program instructions executable to perform said update include program instructions executable to store, for portions of said volume modified subsequent to said first point in time, the contents of said portions at said first point in time.

15. A computer-readable media comprising program instructions executable to:

generate a first snappoint of a volume, wherein the first snappoint is a dataful snappoint in that it includes information indicative-of the contents of said volume at a first point in time and information indicating which portions of said volume have been modified subsequent to said first point in time and prior to a second point in time corresponding to a second snappoint, wherein said first snappoint is a dataful snappoint that includes the original contents of at least said portions of said volume which have been modified;

use said first snappoint to perform a backup of said volume to a backup device;

subsequent to said first point in time, update said first snappoint;

generate said second snappoint of said volume at said second point in time;

perform an incremental backup of said first file after said second point in time by:

accessing information mapping said first file to said volume;

using said information mapping said first file to said volume to determine whether said first snappoint indicates that any portions of said volume that map to said first file have been modified;

if said first snappoint indicates that any portions of said volume that map to said first file have been modified, copying the modified portions from said second snappoint to said backup device, and not copying portions of said volume that map to said first file that have not been modified; and in response to completion of said copying from said second snappoint, changing the first snappoint into a dataless snappoint, wherein said dataless snappoint identifies which portions of the volume are modified relative to said first point in time without identifying the actual contents of the modified portions.

16. The computer-readable media of claim 15, wherein said information indicative of the contents of said volume in said first snappoint includes one or more pointers to locations in said volume at said first point in time.

17. The computer-readable media of claim 15, further comprising program instructions executable to update said first snappoint from having a pointer to a first location in said volume to having, instead of said pointer, the contents of said first location of said volume at said first point in time.

* * * * *